(12) United States Patent
Leslie et al.

(10) Patent No.: US 8,287,005 B2
(45) Date of Patent: Oct. 16, 2012

(54) COMPOSITE DRILL PIPE AND METHOD FOR FORMING SAME

(75) Inventors: James C. Leslie, Fountain Valley, CA (US); James C. Leslie, II, Mission Viejo, CA (US); James Heard, Huntington Beach, CA (US); Liem V. Truong, Anaheim, CA (US); Marvin Josephson, Huntington Beach, CA (US)

(73) Assignee: Advanced Composite Products & Technology, Inc., Huntington Beach, CA (US)

( * ) Notice: Subject to any disclaimer, the term of this patent is extended or adjusted under 35 U.S.C. 154(b) by 0 days.

(21) Appl. No.: 13/342,952

(22) Filed: Jan. 3, 2012

(65) Prior Publication Data

US 2012/0098257 A1   Apr. 26, 2012

Related U.S. Application Data

(60) Division of application No. 12/323,067, filed on Nov. 25, 2008, now abandoned, which is a continuation-in-part of application No. 10/952,135, filed on Sep. 28, 2004, now Pat. No. 7,458,617.

(51) Int. Cl.
*F16L 25/00* (2006.01)
(52) U.S. Cl. ............... 285/9.1; 285/390; 175/320
(58) Field of Classification Search ............... 285/390, 285/9.1; 175/320; 166/65.1, 242.6
See application file for complete search history.

(56) References Cited

U.S. PATENT DOCUMENTS

| | | | |
|---|---|---|---|
| 2,045,520 A | 6/1936 | Davison | |
| 2,139,745 A | 12/1938 | Goodall | |
| 2,301,783 A | 11/1942 | Lee | |
| 2,748,358 A | 1/1952 | Johnston | |
| 3,406,724 A | 10/1968 | Carlström et al. | |
| 3,467,764 A | 9/1969 | Knapp | |
| 3,768,269 A | 10/1973 | Broussard et al. | |
| 3,784,239 A | 1/1974 | Carter et al. | |
| 3,799,587 A | 3/1974 | Chevalier et al. | |
| 3,879,097 A * | 4/1975 | Oertle | 340/855.1 |
| 4,120,521 A | 10/1978 | Parmann | |
| 4,140,324 A | 2/1979 | Mulas et al. | |
| 4,171,560 A | 10/1979 | Garrett | |
| 4,220,381 A | 9/1980 | van der Graaf | |
| 4,236,386 A | 12/1980 | Yates et al. | |
| 4,278,138 A | 7/1981 | Rowley et al. | |
| 4,310,059 A | 1/1982 | Moore | |
| 4,329,193 A | 5/1982 | Sznopek et al. | |
| 4,385,644 A | 5/1983 | Kaempen | |

(Continued)

FOREIGN PATENT DOCUMENTS

DE   1 188 793   3/1965

(Continued)

*Primary Examiner* — Aaron Dunwoody
(74) *Attorney, Agent, or Firm* — Fulwider Patton LLP

(57) ABSTRACT

A lightweight and durable drill pipe string capable of short radius drilling formed using a composite pipe segment formed to include tapered wall thickness ends that are each defined by opposed frustoconical surfaces conformed for self-aligning receipt and intimate bonding contact within an annular space between corresponding surfaces of a coaxially nested set of metal end pieces and a set of nonconductive sleeves. The distal peripheries of the nested end pieces and sleeves are then welded to each other and the sandwiched and bonded portions are radially pinned. The composite segment may include imbedded conductive leads and the axial end portions of the end pieces are shaped to form a threaded joint with the next pipe assembly that includes contact rings in the opposed surfaces of the pipe joint for contact together.

8 Claims, 11 Drawing Sheets

U.S. PATENT DOCUMENTS

| | | | |
|---|---|---|---|
| 4,399,877 A | 8/1983 | Jackson et al. | |
| 4,530,379 A | 7/1985 | Policelli | |
| 4,548,428 A | 10/1985 | Ruhle | |
| 4,614,369 A | 9/1986 | Overath et al. | |
| 4,619,470 A | 10/1986 | Overath et al. | |
| 4,630,849 A | 12/1986 | Fukui et al. | |
| 4,647,078 A | 3/1987 | Lundy | |
| 4,649,960 A | 3/1987 | Policelli | |
| 4,679,831 A | 7/1987 | Kielminski | |
| 4,701,231 A | 10/1987 | Peters et al. | |
| 4,786,536 A | 11/1988 | Kaempen | |
| 4,799,544 A | 1/1989 | Curlett | |
| 4,810,010 A | 3/1989 | Jones | |
| 4,813,715 A | 3/1989 | Policelli | |
| 4,865,356 A | 9/1989 | Moore et al. | |
| 4,872,519 A | 10/1989 | Kopecki | |
| 4,889,318 A | 12/1989 | Sisk | |
| 4,893,658 A | 1/1990 | Kimura et al. | |
| 4,968,545 A | 11/1990 | Fellman et al. | |
| 5,062,914 A | 11/1991 | Fuchs et al. | |
| 5,082,314 A | 1/1992 | Aubry et al. | |
| 5,097,870 A | 3/1992 | Williams | |
| 5,105,854 A | 4/1992 | Cole et al. | |
| 5,148,877 A | 9/1992 | MacGregor | |
| 5,188,401 A | 2/1993 | Staniforth | |
| 5,211,429 A | 5/1993 | Charlson et al. | |
| 5,233,737 A | 8/1993 | Policelli | |
| 5,236,018 A | 8/1993 | Kobayashi et al. | |
| 5,288,109 A | 2/1994 | Auberon et al. | |
| 5,332,049 A | 7/1994 | Tew | |
| 5,334,801 A | 8/1994 | Mohn | |
| 5,398,975 A | 3/1995 | Simmons | |
| 5,443,099 A | 8/1995 | Chaussepied et al. | |
| 5,507,346 A | 4/1996 | Gano et al. | |
| 5,579,854 A | 12/1996 | Barry | |
| 5,685,576 A | 11/1997 | Wolfe et al. | |
| 5,713,423 A | 2/1998 | Martin et al. | |
| 5,816,344 A | 10/1998 | Turner | |
| 5,895,079 A | 4/1999 | Carstensen et al. | |
| 5,908,049 A | 6/1999 | Williams et al. | |
| 5,913,337 A | 6/1999 | Williams et al. | |
| 5,921,285 A | 7/1999 | Quigley et al. | |
| 5,927,409 A | 7/1999 | Turner | |
| 5,944,124 A | 8/1999 | Pomerleau et al. | |
| 5,988,695 A | 11/1999 | Corbett, Jr. | |
| 6,113,159 A | 9/2000 | Corbett, Jr. | |
| 6,186,558 B1 | 2/2001 | Komolrochanaporn | |
| 6,244,631 B1 | 6/2001 | Payne et al. | |
| 6,315,002 B1 | 11/2001 | Antal et al. | |
| 6,367,564 B1 | 4/2002 | Mills et al. | |
| 6,378,633 B1 | 4/2002 | Moore et al. | |
| 6,641,434 B2 | 11/2003 | Boyle et al. | |
| 6,670,880 B1 * | 12/2003 | Hall et al. | 336/132 |
| 6,688,396 B2 * | 2/2004 | Floerke et al. | 166/380 |
| 6,734,805 B2 | 5/2004 | Johnson | |
| 6,830,467 B2 | 12/2004 | Hall et al. | |
| 6,866,306 B2 | 3/2005 | Boyle et al. | |
| 6,913,093 B2 | 7/2005 | Hall et al. | |
| 7,002,445 B2 | 2/2006 | Hall et al. | |
| 7,064,676 B2 | 6/2006 | Hall et al. | |
| 7,080,998 B2 | 7/2006 | Hall et al. | |
| 7,093,654 B2 | 8/2006 | Hall et al. | |
| 7,168,510 B2 | 1/2007 | Boyle et al. | |
| 7,201,240 B2 | 4/2007 | Hall et al. | |
| 7,277,026 B2 | 10/2007 | Hall et al. | |
| 7,299,867 B2 | 11/2007 | Hall et al. | |
| 7,413,021 B2 | 8/2008 | Madhavan et al. | |
| 7,535,377 B2 | 5/2009 | Hall et al. | |
| 2007/0102197 A1 | 5/2007 | Rotthaeuser | |
| 2008/0012569 A1 | 1/2008 | Hall et al. | |
| 2008/0251247 A1 | 10/2008 | Flint et al. | |
| 2009/0038849 A1 | 2/2009 | Braden et al. | |
| 2009/0058675 A1 | 3/2009 | Sugiura | |
| 2009/0151926 A1 | 6/2009 | Hall et al. | |
| 2010/0175890 A1 | 7/2010 | Bray et al. | |
| 2011/0042072 A1 | 2/2011 | Villegas et al. | |

FOREIGN PATENT DOCUMENTS

| | | |
|---|---|---|
| EP | 0 226 996 | 7/1987 |
| EP | 0 264 446 | 4/1988 |
| EP | 0 266 810 | 5/1988 |
| EP | 0 292 998 | 11/1988 |
| EP | 0 361 639 | 4/1990 |
| FR | 2 656 403 | 6/1991 |
| GB | 1 522 240 | 8/1978 |
| WO | WO 99/17045 | 4/1999 |

* cited by examiner

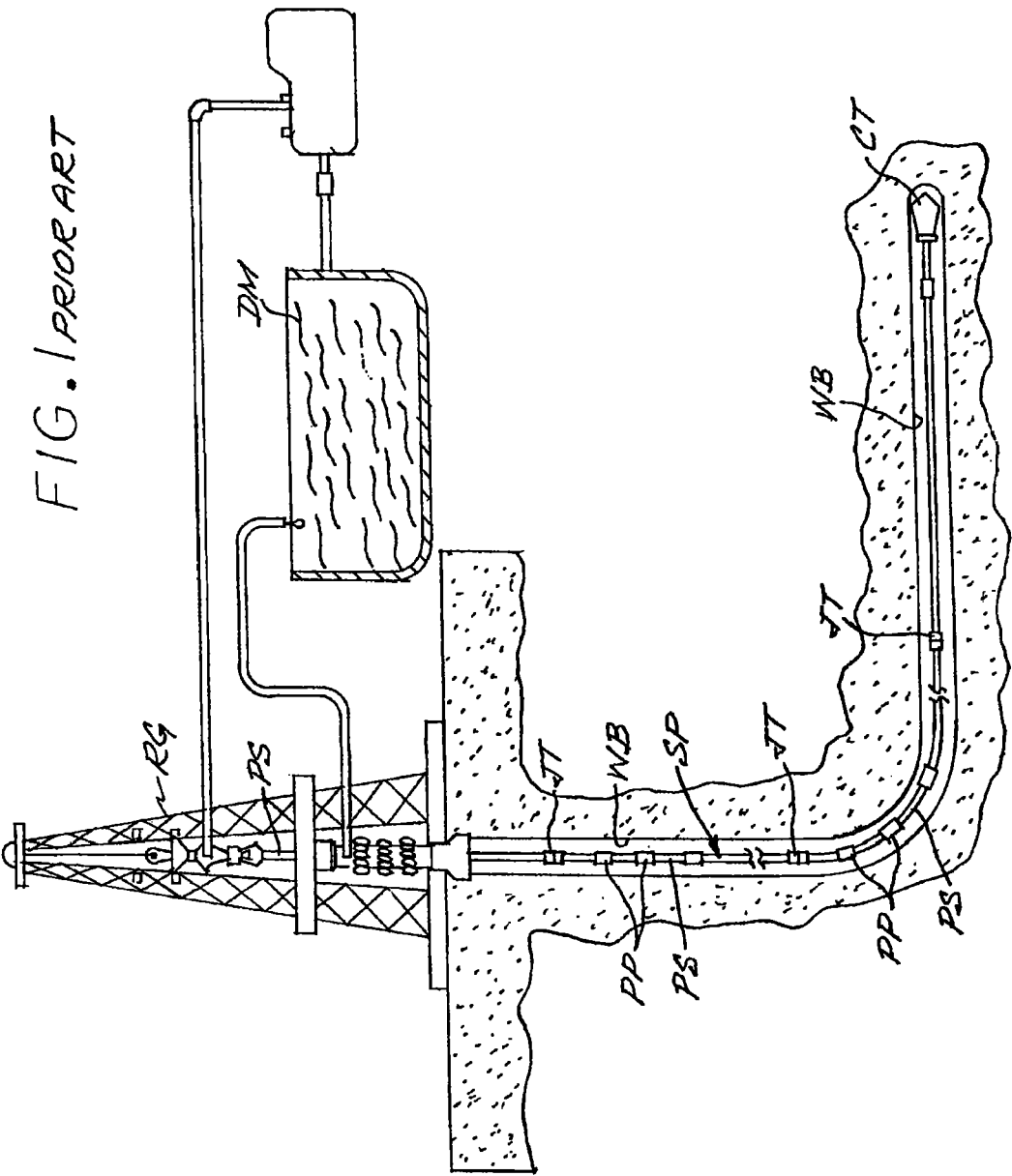

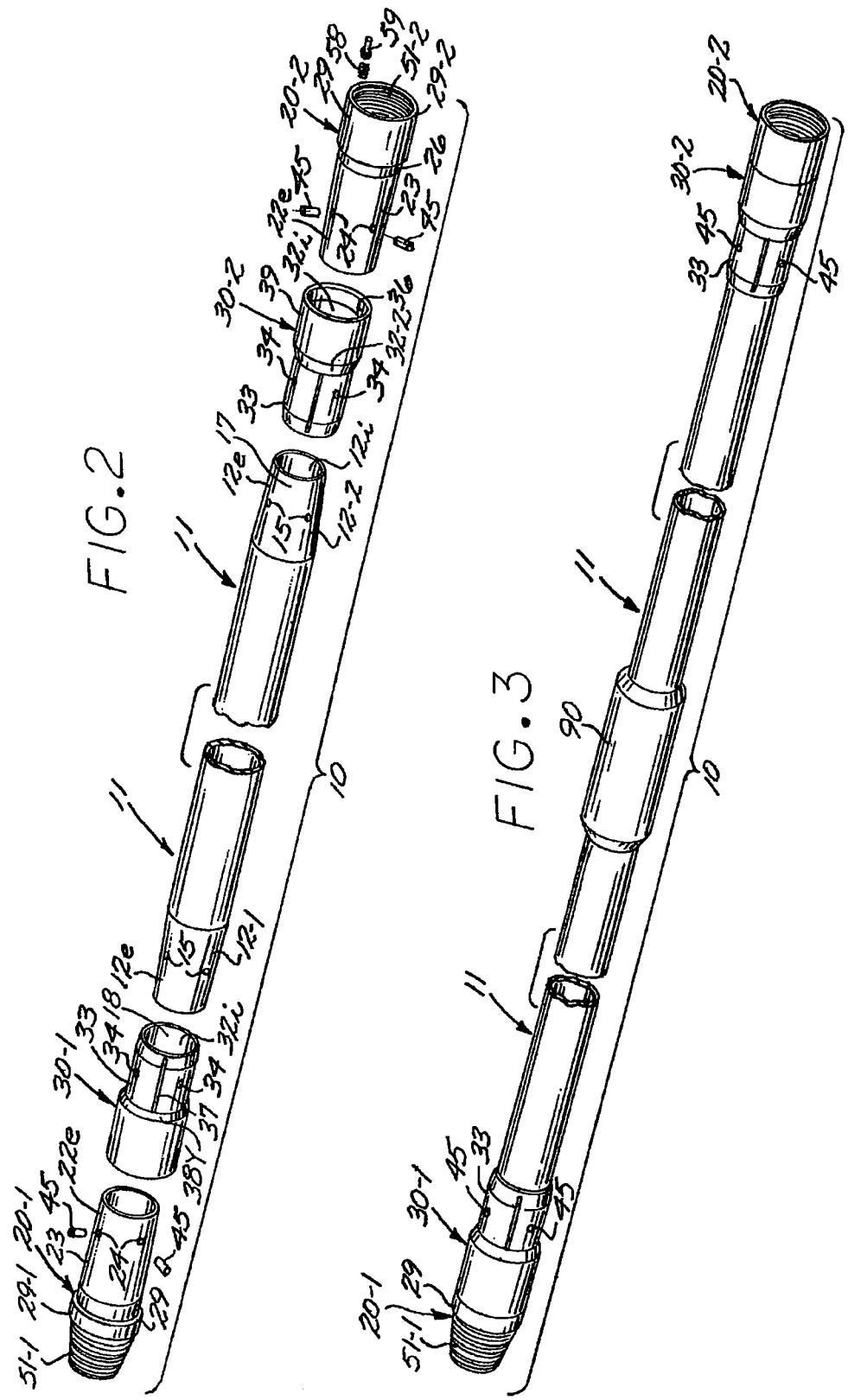

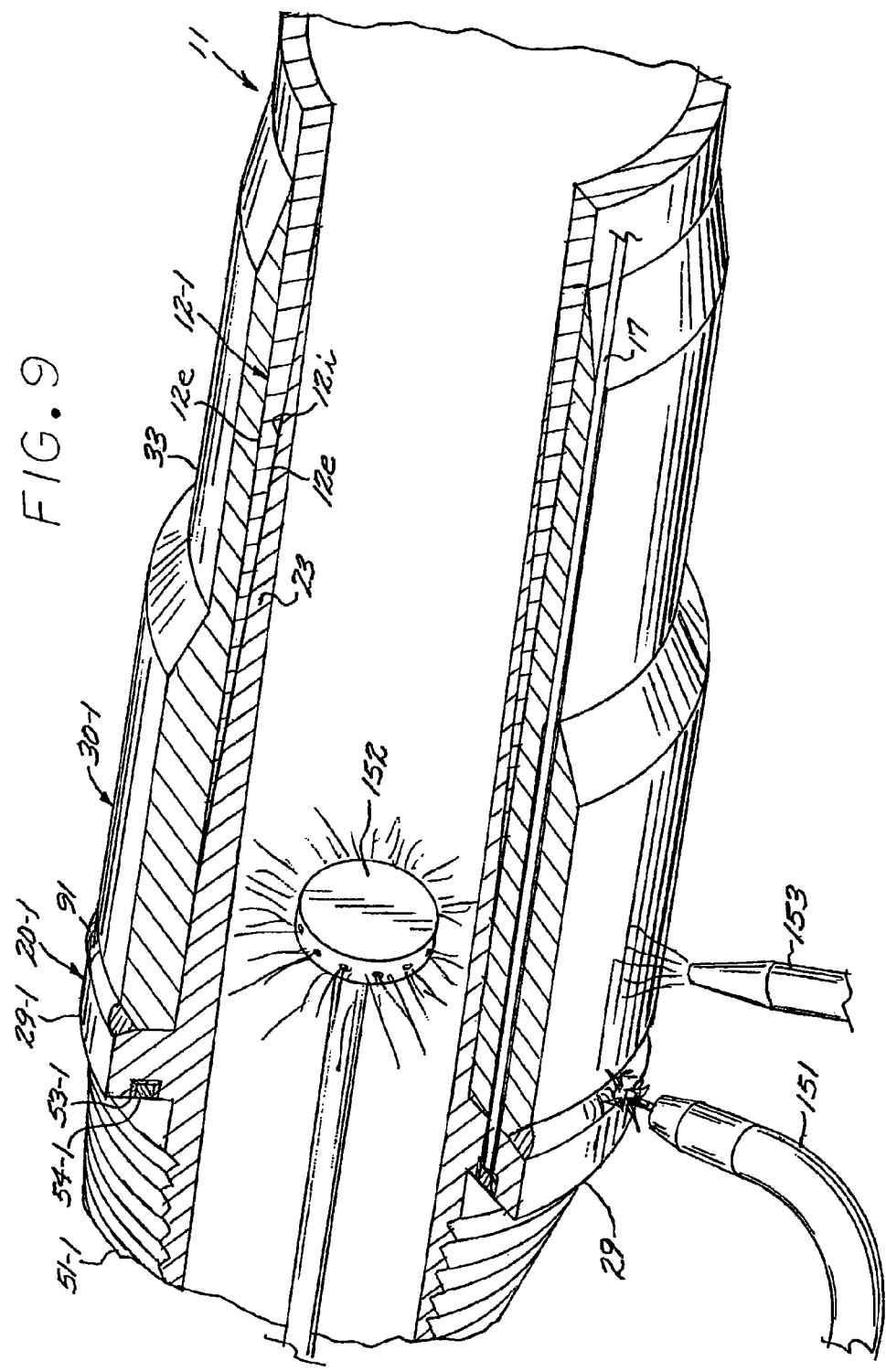

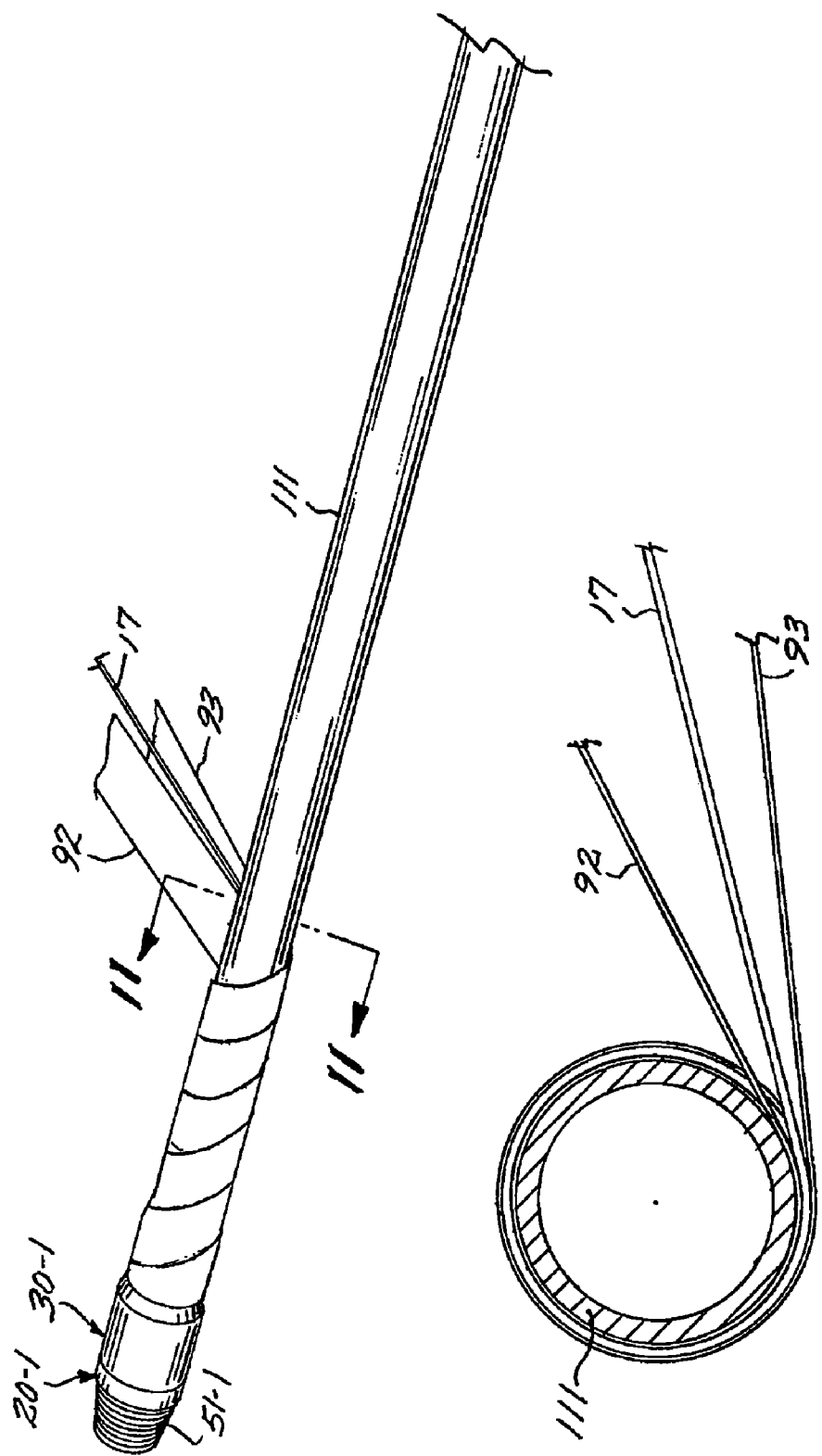

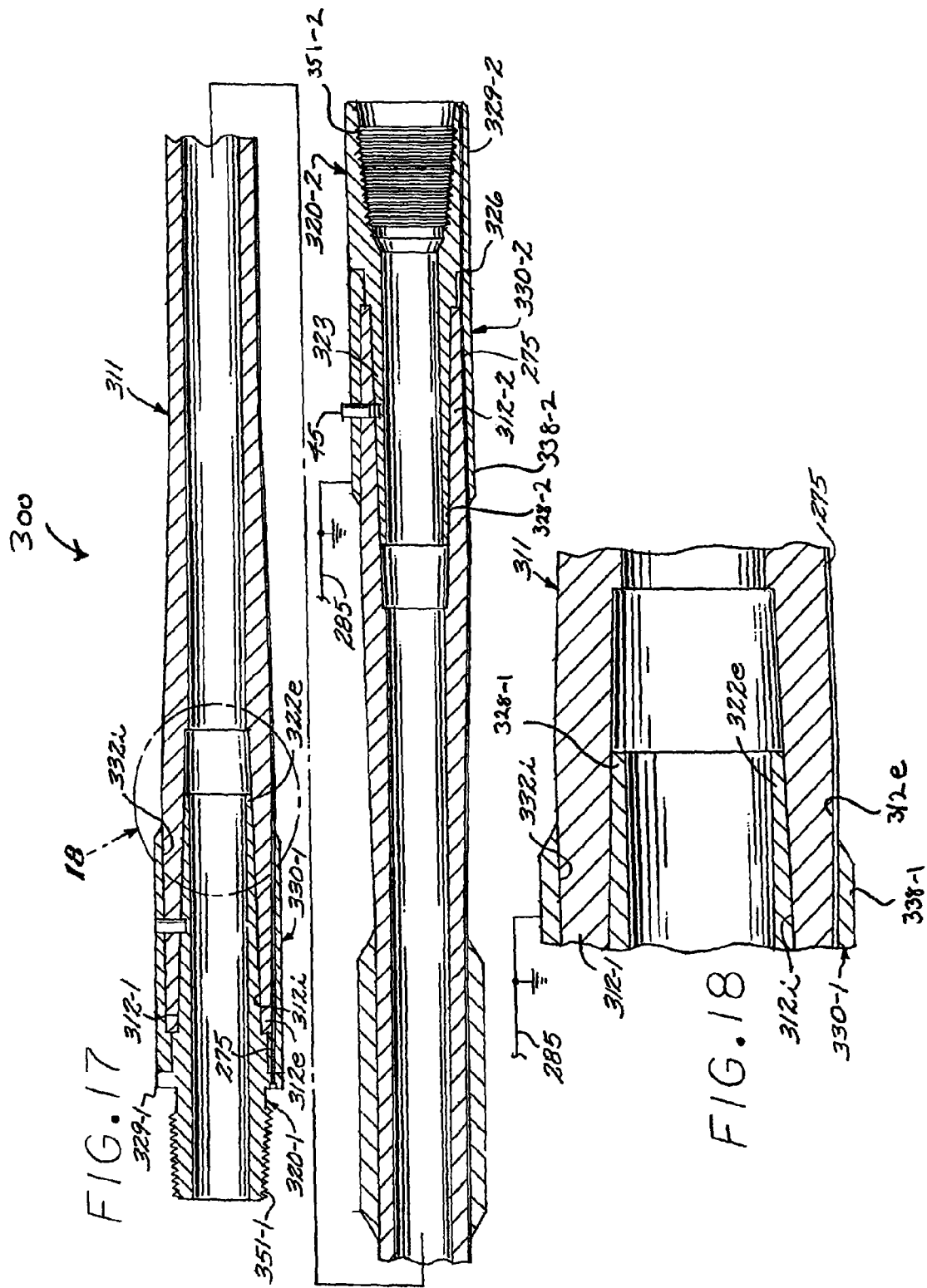

COMPOSITE DRILL PIPE AND METHOD FOR FORMING SAME

CROSS-REFERENCES TO RELATED APPLICATIONS

The teachings herein constitute a divisional application Ser. No. 12/323,067 filed Nov. 25, 2008 which was continuation-in-part of the matter disclosed in U.S. patent application Ser. No. 10/952,135 filed Sep. 28, 2004, now U.S. Pat. No. 7,458,617, and the benefit of this earlier filing data is claimed for all matter common therewith.

STATEMENT OF GOVERNMENT INTEREST

This invention was partly funded by the Government of the United States of America under Cooperative Agreement No. DE-FC26-99FT40262 awarded by the U.S. Department of Energy and the Government of the United States of America has certain rights in the invention.

BACKGROUND OF THE INVENTION

1. Field of the Invention

The present invention relates to drill pipe strings and the method for forming the same, and more particularly to providing a lightweight string for extended reach and short radius drilling and to protecting connections for transmitting signal and/or power across the joints forming the pipe string.

2. The Prior Art

Oil well drilling is often performed from drilling platforms, which, for deep water applications may involve costs of several hundred thousand dollars per day. Thus, there is a great demand for drill pipe strings which are lightweight yet durable enough to reach greater distances by directional drilling from the platforms to thereby add to the return on investment. The design discipline for short radius and extended reach are often different but both benefit from favorable strength to weight ratios.

The ability to adjust drilling rate, reach and direction in the pursuit of oil traps has long been rendered inefficient by the lack of a reliable and durable pipe string and method for obtaining feedback during drilling. The depth and reach of exploration are restricted primarily by the cumulative weight and unit strength of a drill pipe string. Steel pipe has been effective for its durability but its weight-to-strength ratios has reached its boundaries in ultra-deep, deep directional and/or extended reach drilling because of its weight or by the weight induced friction of the rotating pipe string as it rests on the walls of the well bore or rubs against the casing wall. The stiffness associated with steel has also made adjusting to or performing short radius turns difficult and dangerous as drill operators are essentially guessing at the changes in subterraneous conditions as the pipe progresses without consistent signal feedback. The drilling entrepreneur, therefore, has been limited for some time by the stiffness, the unit weight, and the fatigue, shear and tensile strength limits of metal pipe.

Furthermore, deep drilling and directional drilling require monitor and feedback of the drilling environment. As a drill string progresses, the rotational velocity, torque, and stress variations require measurement to guide the drill workman in adjusting the drill operation. Measuring while drilling (MWD) also allows the drill operator to periodically check the likelihood of successfully locating an oil trap. The dilemma thus far has been in successfully leading a signal down the pipe. Prior efforts have focused on leading instrumentation or signal lines down through hollow pipe interiors. Signals that are traditionally carried down through the pipe tend to suffer adverse consequences of the rigorous and treacherous environment associated with drilling. As the pipe progresses, chunks of sharp, hard earth and particulates regurgitate back toward the surface along the pipe circumference or through its interior. As a result, various material alternatives have been proposed both to reduce the linear weight and flexure of the string as well as to improve its fatigue, shear and tensile limits and methods proposed to carry a signal between pipe string segments. The search for light weight and high strength material substitutes has led to composite pipe structures since composites also offer the added benefits of being more resistive to corrosion.

Composites, while sufficiently lightweight and durable for deep and directional drilling, are less effective at forming the mechanical joints required in drill pipes. While virtually all drilling operations require limited length pipe segments determined by the size of the drilling rig and/or the handling power of any lifting equipment, the step of joining such pipe segments into a long string is a fundamental aspect of all drilling. For this reason, the more recent development focus has been directed to the interface between the composite wall of the pipe and metal end fittings on a segment end. The interface of these two structures provides an economically and mechanically viable structure for extended reach and short turn radius drilling.

Composite materials have a further advantage that heretofore has not been extensively recognized, namely the convenient imbedding of signal and/or power conductors into the laminates forming the pipe wall. Imbedding the signal within the pipe walls is particularly useful with short radius directional drilling since it allows for an uninterrupted, continuous down hole signal feedback and control augmentation while drilling, thus maximizing the effectiveness of the invariably very high drilling costs at the remaining remote or deeply submerged formations. Additionally, the non-conductive nature of composites insulates electrical signals when used, preventing dissipation of power into the pipe walls. This synergistic aspect of composite pipe has not been fully recognized nor exploited in the art simply because the technical challenge of forming an effective connection between the composite tube wall and the end fitting has overwhelmed all other considerations. The process of imbedding conductors or connecting them across a joint from a metal/composite interface coupled with protecting the signal line down the pipe string length has therefore been relegated to inattention.

At the core is the inherent difficulty in forming a high integrity interface between the composite pipe wall and the adjoining surfaces of the end fitting. In the past, fitting assemblies with variously opposing surface geometries have been proposed to effect a secure capture of the composite end within the fitting. Some examples of such end fittings include those taught in U.S. Pat. No. 5,233,737 to Policelli; U.S. Pat. No. 4,810,010 to Jones; U.S. Pat. No. 6,315,002 to Antal et al.; and others. While suitable for the purposes intended each of the foregoing assemblies include threaded or otherwise releasably engaged parts clamping the composite between each other with inherently uneven load concentrations resulting in highly uneven shear stresses. This uneven load distribution between adjacent parts, of course, results in correspondingly uneven local strain deformations when exposed to the various high loadings in the course of use. There is therefore an inherent incidence of local bond separation between the composite itself and the adjoining fitting surface, with some consequence for failure.

Alternatively, end fitting assemblies have been proposed in which radial pins or other radial fasteners are added to the assembly, as exemplified by the teachings of U.S. Pat. No. 5,332,049 to Tew; U.S. Pat. No. 5,288,109 to Auberon et al.; U.S. Pat. No. 5,443,099 to Chaussepied et al.; and others. Once again, while a change is realized from these radial interconnections the essentially separated nature of a single metal to composite surface interface is also susceptible to uneven load transfer with the consequent local separations an inherent possibility. For example, the '109 patent to Tew appears to disclose a single metal-composite interface held together by radial pins and an adhesive bond which may suffer from disparate torsional forces. Tew appears to propose an outer protective sheath lacking a tapered surface interface and suffers the shortcoming that, particular to long reach applications, the coupling itself fails to provide a high strength joint capable of carrying the high torsional force necessary to withstand the loads of both extended reach applications and short radius. Moreover, such assemblies suffer from a lack of another significant attribute, namely the bridging of a protected electrical signal between pipe connections.

In the past various conductor connection arrangements bridging a pipe joint have been proposed for transmitting power and signals down pipe strings. Examples of such arrangements can be found in the teachings of U.S. Pat. No. 6,367,564 to Mills et al.; U.S. Pat. No. 4,220,381 to van der Graaf, U.S. Pat. No. 2,748,358 to Johnston; and U.S. Pat. No. 5,334,801 to Mohn. Each of these, and others similarly implemented, either refer to indirect coupling like that obtained by capacitive coupling or by Hall effect, or speak of full insulation of paired leads in light of the conductive nature of the pipe string, or incorporate a conductive tube surrounded between two insulative regions as in the '564 patent to Mills. Additionally, where electrical leads are incorporated throughout the pipe string, the signal and power carrying arrangements suffer from being lead down the string either within the pipe hollow passage or external the pipe exposed to damaging objects. Thus while suitable for the purposes intended these prior art teachings do not avail themselves to all the advantages of a composite, non-conducting pipe string and the protective capabilities of embedding a conductor in the composite walls and it is these advantages that are realized herein. Such arrangements are either prone to damage or add significant weight and contribute to inflexibility in the pipe string by incorporating full length metal tubes within the structure.

Pipes has been proposed which include current loop inductive couplers with the electrical cables running along the interior of the pipe sections. A device of this type, as shown in U.S. Pat. No. 6,866,306 to Boyle. The adductive loop coupling has not proven particularly acceptable and the electrical cable exposed on the interior of a pipe subjects the cable to the elements within the pipe and to damage from components extended through the pipe. Furthermore, such pipe devices do not lend themselves to short turn pipe constructions.

It can be seen then that a need exists for a lightweight and durable structure capable of withstanding the rigors of deep and directional drilling that is also capable of carrying a protected signal down a pipe string length.

SUMMARY OF THE INVENTION

Briefly and in general terms, the present invention is directed to a segment of drill piping constructed of composite materials connected end to end with metallic end fittings in a manner that provides a diffusion of torsional loads on a metal-composite junction and protects a signal carrier throughout the length of the pipe. A metallic end fitting is connected to the composite pipe section to form a first metal-composite interface partially carrying torsional loads. The interface is reinforced by a metallic sleeve attached concentrically about the first interface to form a second metal-composite interface also carrying torsional loads. The composite pipe segment includes at least one conductive lead embedded in its walls that are exposed at each pipe segment end and connected to extremities of the end fittings.

The conductor is carried down a strong lightweight drill pipe string with a composite to metal interface by forming reinforced composite tubular segments. Each segment is made from a generally uniform wall thickness and the conductor is embedded within these composite walls with ends exposed at each segment end. Each wall may be constructed with both ends linearly tapered to a reducing wall thickness over a fixed axial increment. Both the interior and exterior tapers of these substantially identical end surfaces are then each mated and bonded to corresponding linearly tapered portions of cylindrical metal end fitting pieces and metallic sleeve fittings being further conformed for a closely fitted annular nested assembly. Once fully nested the dimensions of the tapered gap thus formed between the fittings closely match the end tapers of each composite segment, assuring an intimate surface contact and therefore an effective bond over the full surface of the metal to composite interfaces, the centralizing taper assuring this bond with or without bond line control. The end of the metal fitting is formed to extend beyond its nested receipt within the exterior piece to form either the male or female end of a threaded drill pipe connection, commonly referred to as the 'pin end' and the 'box end' of the pipe segment. The exposed conductor ends are conveyed through the sleeve and end fittings to make contact with a conductive contact ring. Upon coupling of adjacent male-female fittings, the outward facing surface of the contact rings engage one another effecting an electrical contact across the joint.

The metal end fittings are formed with threaded bores so that a male end on one pipe segment will fit into the female end of an adjacent pipe segment. The end fittings include a flange with a shoulder at the flange base. Formed within each flange is an annular recess defined by an abutment surface formed at the flange interior base. The abutment surface includes multiple bores extending through the flange shoulders. The end fitting further includes a skirt projecting distally away from the flange with interior and exterior surfaces formed to fit concentrically with the ends of the pipe segment and the sleeve as described above.

The sleeve includes a flange and shoulder at its base and a skirt projecting distally therefrom. The sleeve interior surface is formed to cooperate with the exterior surface of the pipe segment and assists in reinforcing the metal to composite interface of the pipe segment and end fitting. The sleeve flange rests against the fitting shoulder and a bore at the sleeve shoulder allows the exposed lead ends to pass through the sleeve flange and into the end fitting shoulder to make contact with a conductive contact ring leg described more fully herein.

Those skilled in the art will appreciate that the foregoing assembly results in a fairly large composite-to-metal interface surface for effecting the bond, thus widely diffusing any load concentrations thereacross. To reinforce the joint interface, further steps are provided for integrating the assembly into a unitary structure once the initial bond has been made. More precisely, the distal portions of the nested inner and outer pieces are each in direct contact with adjacent exterior flange rings which are then welded to each other while the portions thereof forming the interface cavity with the composite end bonded therein are cooled by water spray. Following this welding step the bonded portion may receive a plurality of radial pins press fit and secured through matched openings in the tapered skirts of the inner and outer piece and also through corresponding openings in the tapered end of the composite pipe segment bonded therein to fully tie the separate items into an integral structure, with the press fit receipt of the pins in the more resilient composite insuring an internal compression prestress across the bond. In this manner all, the conveniences of a part-wise assembly are retained while the resulting end structure has all the advantages of an integral unit. More importantly, this manner of assembly insures a self-centralizing benefit where the tapered ends of the composite segment themselves provide the reference structure against which the inner and outer pieces are aligned. Once this centralized alignment is fixed by bonding the intimately aligned surfaces to each other the subsequent welding, and pinning if desired of the nested pieces assures the end structure the integrity necessary to transfer the large stresses developed across the joint.

The same convenience of part-wise assembly that results in an integral structure is also useful in realizing further benefits associated with composite tubes, namely the benefit of bridging across the pipe joint electrical or signal continuity between embedded signal or power leads in each segment. In a first example, the part-wise assembly process allows insertion of exposed ends of imbedded conductors into passages formed in the sleeve for connection to axially aligned spring biased pins mounted on pistons within a sealed manifold of the end fitting. Application of pressure to the manifold then extends the pins against their spring bias to pierce the insulation covering on concentric annular contact rings deployed in the opposed mating surface of the next adjacent end fitting threadably mated therewith, with the contact rings in turn connected for electrical contact with corresponding conductors imbedded in the next segment, and so on.

In a second example both the opposed faces surrounding the threaded connection each include opposing annular recesses within which coaxial contact rings are received within an annular insulating ring formed with annular walls that define an annular gap. The insulating ring includes multiple hollow open-ended legs extending axially out and fit into the bores in the abutment surface of the end fitting. A conductive contact ring with multiple legs projecting axially to fit into the insulation ring bores rests within the insulation ring. The insulating ring and contact ring assembly are inserted into the annular recess with the insulating ring legs fitting into the bores of the abutment surface. Preferably the contact rings project slightly beyond each of the opposing surfaces and as the pipe joint of the next segment is threadably coupled to the pipe string the resulting compression of the rings against each other then effects the contact between the opposed joint ends. To assure complete sealing of each ring by the walls of the insulating seal the peripheries of some of the ring surfaces may be chamfered to provide annular voids into which the excess insulation material can flow as the joint ends are threaded together. Each of the rings, moreover, may be perforated to engage a corresponding lead end extending through the insulator which then similarly seals by material flow this part of the surface and the buried edge of the rings may include axial projections that extend into conforming pockets formed in the seal to engage depressions in the groove bottom and thereby fix the ring and seal combination against rotation in the groove as the threaded pipe joint is made.

Thus a quick and expedient contact mechanism is devised either effected by the pressurizing step or by the threaded advancement of the joint ends onto each other thereby providing for a convenient transmission of signal or power down the well bore. The foregoing connection sequence may be utilized with composite segments of a layered construction, resulting in a fully sealed pipe string, a manner of construction that obtains further convenience for fabrication mandrel release by introducing internal pressure once the core layer has been formed with the pressurized core then serving as its own mandrel for next the successive wrappings of fiber and further interleaved membranes.

Those in the art will appreciate that this layered construction process allows for introduction of sealant between selected layers while appropriate compliance selection of the other layers and the fiber wrapping angle can then be used to control the bending compliance and thus the turning radius of the resulting piece. In this manner, all the desired functions and attributes can be accommodated in the assembly process which then renders pipe segments that are particularly useful in the ultra deep and extended reach drilling efforts that are currently required.

In a third example of the present invention, load diffusion across the metal-composite interface is further enhanced by utilizing an alternate construction. The cross-sectional area of the metal-composite interface is altered by positioning the ends of the linearly tapered cylindrical metal end fittings and sleeves longitudinally offset from one another. In one formation of the resulting nesting cavity, the cylindrical wall of the end fitting extends deeper into the pipe segment interior than the concentrically surrounding sleeve wall. Thus, a reinforced and nested metal-composite interface is maintained while providing enhanced diffusion of stress loads across the joint surfaces and in turn, providing a supported degree of flexing at the juncture.

Other features and advantages of the invention will become apparent from the following detailed description, taken in conjunction with the accompanying drawings which illustrate, by way of example, the features of the invention

BRIEF DESCRIPTION OF THE DRAWINGS

FIG. 1 is a perspective illustration, separated by parts, of a conventional drill pipe string extended into a well bore;

FIG. 2 is an exploded perspective illustration, partially in section, of the metal to composite end fitting assembly embodying the pipe assembly;

FIG. 3 is a further perspective illustration of the pipe assembly incorporating the parts illustrated in FIG. 2;

FIG. 9 is a perspective illustration, in partial section, of the tooling arrangement useful in combining the inventive assembly into an integral fixture;

FIG. 10 is a diagrammatic view, in perspective, illustrating the inventive implementation of a forming facility useful in forming the composite pipe segment on a rotary mount incorporating portions of the end fitting assembly;

FIG. 11 is an enlarged cross sectional end view taken along the line 11-11 of FIG. 10.

FIG. 17 is a broken longitudinal sectional view of a third embodiment of the pipe assembly shown in FIG. 3; and FIG. 18 is a detailed view in enlarged scale taken from the circle 18 shown in FIG. 17.

DETAILED DESCRIPTION OF THE PREFERRED EMBODIMENTS

As shown in FIG. 1 current drilling practices depend on a string SP composed of drill pipe segments PS connected end-to-end to turn a cutting tool CT mounted on the lower string end. In the course of such turning, the tool CT grinds and penetrates through the bottom of the well bore WB with the particulates continuously brought out to the surface by a circulating flow of drilling mud DM pumped into the bore to equalize bore pressures. As readily available formations are depleted these drilling projects now extend to much greater depth, and/or greater lateral reach, with the weight of the pipe string SP and/or its friction load in the well bore setting the practical exploration limits. The complexity of a drilling rig RG conformed for such long reach drilling is enormous and the logistics of its movement alone, encourage directional capability along with an increasing pipe string. This same complexity of the rig also determines the manipulation convenience of each of the pipe segments PS, again resulting in its own logistic and mechanical constraints resolved by the size of the rig (or off-shore platform) that can be effectively implemented at the well site, thereby limiting the length of each segment PS and multiplying the number of required joints JT that need to be made to extend the string to the desired depth. The combined weight of the string, including all the down hole joints and any wear knots or pipe protectors 90 shielding the pipe from wall contact, along with the friction load resulting from this wall contact, are thus resolved at the last surface joint which sets the design limit. It is within this limit that the rig operator tries to discover oil by periodic insertion of instruments down the bore, or simply by inspecting the drilling debris brought to the surface.

In addition to the above physical concerns there are also those imposed by various laws and ordinances dealing with the environment. There is currently substantial public resistance to the equipment clutter associated with crude oil production appearing in one's neighborhood, further promoting directional drilling, a technique that compounds torsional loading as very long drill pipe strings are turned while resting on the wall of the well. This same technique also demands shorter radius turns, or a more flexible pipe, and also accurate instrumentation to inform the operator of the actual direction that is being drilled and of any formation details that are encountered. For all these reasons light weight, high strength, but elastic pipe is desired, particularly if signal and power conductors can be combined therewith. All these concerns are now substantially resolved in the inventive structure and process described by reference to FIGS. 2-18.

Figure 4:
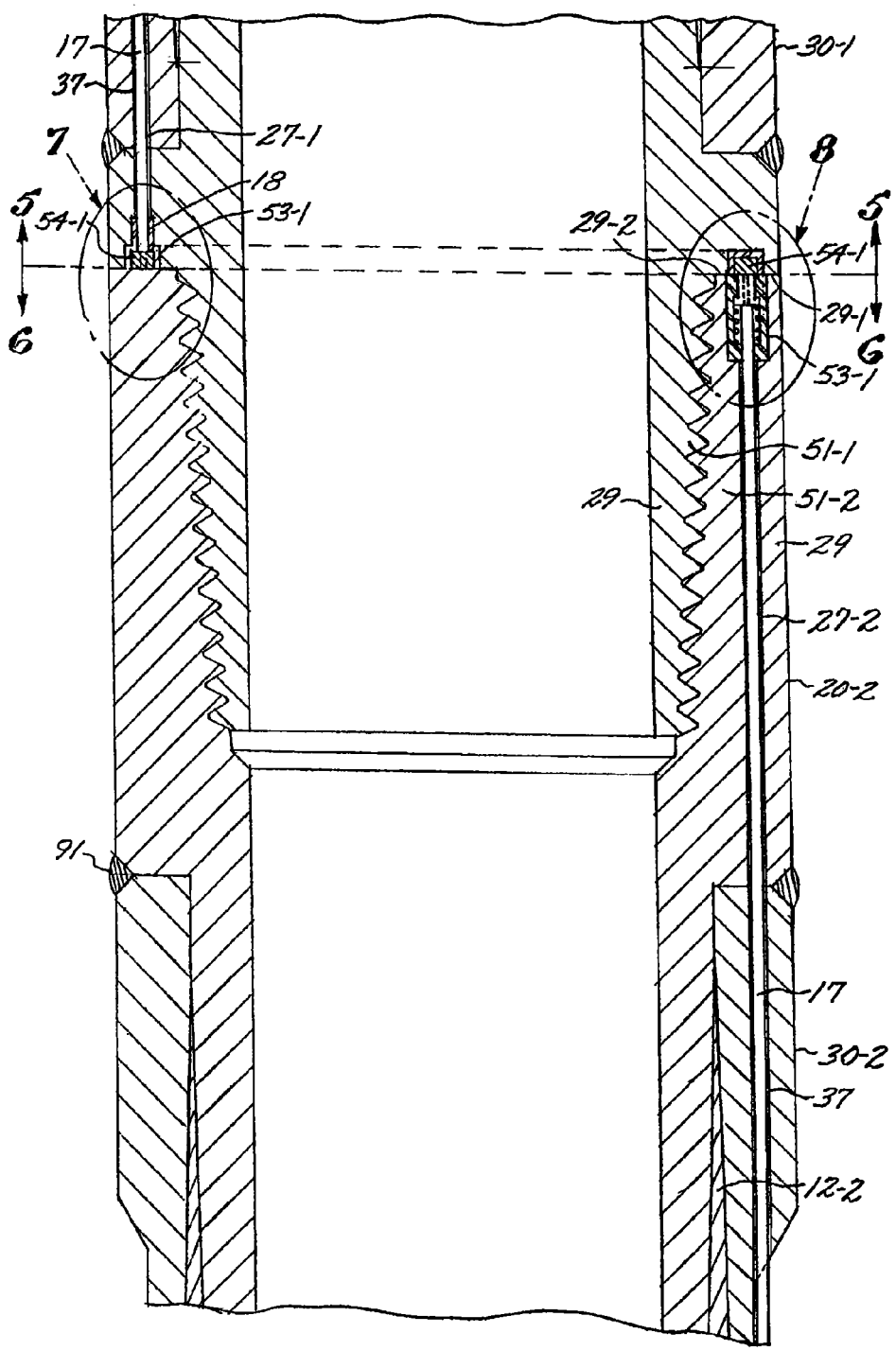
FIG. 4 is a sectional view, of a coupled pipe joint illustrating the signal connection between pipe parts shown in FIG. 2.
Figure 8:
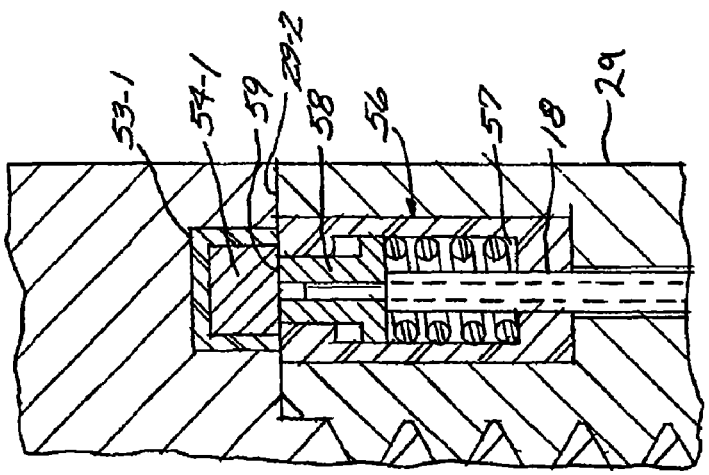
FIG. 8 is a side view, enlarged of the circle shown in FIG. 4.
Figure 7:
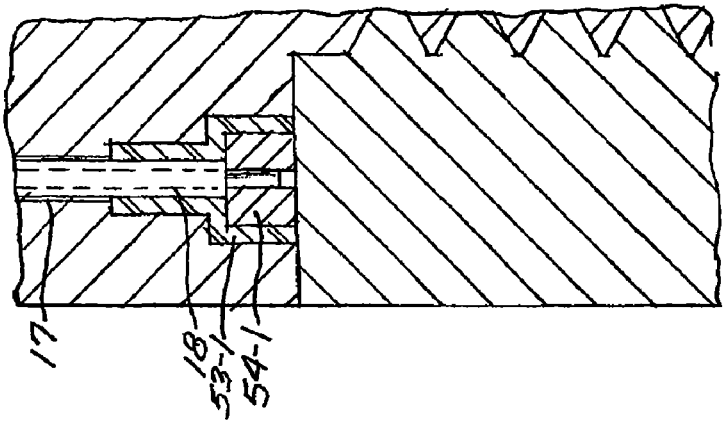
FIG. 7 is a side view, enlarged of the circle shown in FIG. 4.

By particular reference to FIGS. 2-4 the inventive pipe assembly, generally designated by the numeral 10, comprises a tubular composite pipe segment 11, formed by winding up reinforcing fiber, such as carbon fiber, preferably wound in stress determined orientation patterns between plies of interleaved wrapping, all bonded together by resinous filler to form a cylindrical structure of a generally uniform wall thickness over most of its length.

Pipe segment 11 may be formed with a generally uniform taper along a selected portion of each end 12-1 and 12-2 reducing in wall thickness. Each end may be defined by interior and exterior wall surfaces 12i and 12e respectively, that are configured for receipt within conforming annular cavities formed by male and female couplers comprising a set of nested metallic end fittings 20-1 and 20-2 and metallic sleeves 30-1 and 30-2. Those skilled in the art will appreciate that the surfaces of the pipe segment and adjoining structures for that matter, may use other surface configurations, yet, in one embodiment, tapered and frustoconical surfaces are used permitting a diffusion of torsional loads across the surfaces of connected pieces.

The metallic end fittings 20-1 and 20-2 include a flange 29 with shoulders 29-1 and 29-2 and skirt 23 including an exterior surface 22e tapering in reducing cross section away from the flange.

The metallic sleeves 30-1 and 30-2 include respective telescoping flanges 39 and skirts 33 formed with interior surfaces 32i tapering in expanding cross section away from the flange.

The annular cavities formed by the nested pieces are formed by axially aligning the tapered exterior surface 22e of skirt 23 adjacent an oppositely tapered surface 32i on the skirt 33 interior. The surfaces 22e and 32i are each closely matched to respective dimensions and tapered surfaces 12e and 12i where insertion of the surfaces 12e and 12i into the annular cavity forms an aligned pipe segment end interface. Those skilled in the art will appreciate that this self aligning construction creates a bonding interface that can be effected by any high temperature epoxy resin and will further appreciate that the close fit of this bond is further enhanced by close dimensional matching between the coaxially nested end fitting and sleeve pieces so that the sleeve forms a peripheral support for the tapered end of the pipe segment as it is slid into position within the end fitting.

In addition, each of the skirts 23 and 33, moreover, may include a radially matched set of lateral openings 24 and 34 dimensioned for press fit or interference receipt of corresponding optionally used pins 45 that also pass through corresponding circular openings 15 formed in the tapered ends 12-1 and 12-2 once the ends are fully received, bonded and indexed within their receiving cavities. This same indexed alignment may orient the exposed ends 18 of conductor leads 17 that are woven into the filament matrix of the pipe segment 11 into alignment with longitudinal drillings 37 formed in skirts 33 to effect an electrical connection across the pipe joint herein described. Beyond this bonding receipt, each of the pieces is formed as a closely dimensioned telescoping cylindrical segments 26 and 36 which are each provided with corresponding exterior flanges 29 and 39 aligned next to each other when the skirts are properly positioned. Of course, the same drillings 37 extend through the flange 39 to convey the lead ends 18 therethrough.

Those skilled in the art will appreciate that while pieces 20-1 and 20-2, and also pieces 30-1 and 30-2, are described above by identical descriptions, in application one of the nested end piece sets serves as the male portion of the threaded joint, otherwise referred to as the 'pin end', and the other end piece set serves as the female threaded, or the 'box end'. Accordingly, those parts of the end fitting pieces 20-1 and 20-2 that are exterior of flanges 29 are of necessity different depending on the joint function that is formed. Thus end fitting 20-1 includes a threaded boss 51-1 extending beyond the exterior shoulder 29-1 of the flange 29 that is conformed for threaded receipt in a threaded cavity 51-2 formed in the other exterior shoulder 29-2 of the other flange 29 on the end fitting piece 20-2. Each of the flanges 29, moreover, includes drilling continuations shown as drillings 27-1 and 27-2 (FIG. 4) aligned with drillings 37, drilling 27-1 conveying the conductor end 18 into a circular recess 53-1 formed in the flange shoulder surface 29-1 where the lead is connected to an insulated ring 54-1 conformed for receipt within the interior of recess 53-1.

In an exemplary assembly, the overall length of the pipe assembly 10 measures approximately 359 inches. In this assembly, the composite pipe 11 measures 338.00 inches long between respective outer sleeve proximal ends 30-1 and 30-2 and includes an inner diameter of 1.625 inches and an outer diameter of 2.510 inches intermediate the end assemblies. The diameters expand outwardly therefrom toward the assembly fittings where the pipe inner surface 12i and exterior surface 12e respectively are formed with radial dimensions matching their confrontment with end fitting exterior surface 22e and sleeve inner surface 32i respectively. The overall pipe string diameter expands from the composite pipe 11 outer diameter of 2.510 inches to a metallic fitting end diameter of 3.405 inches. The length of the "pin" end assembly measures approximately 10.00 inches from the distal end of male boss 51-1 to the outer sleeve 30-1 proximal end. The "box" end assembly measures approximately 1.00 inch longer between respective like features of female boss 51-2 and sleeve end 30-2 to accommodate the male boss 51-1. Thus, it will be appreciated that the metal to composite conjunction is useful in extended reach applications by providing a diffusion of loads across the joint interface.

During operation in extended reach drilling applications, as pipe strings drill deeper into earth using longer strings, the greater the weight of the string becomes, thus promoting drag and inhibiting drilling performance and efficiency. Greater weight contributes to increasing tensile strength loads under the increasing pressures of deep extended reach drilling environments pulling and stretching on the pipe assembly components, and in particular, tugging on joints where tensile loads can separate parts. As will be appreciated, the length of the drill string of the presently described embodiment is approximately 86% composite material length compared to approximately 14% metallic material length. The metal is primarily reserved for the end fittings 20 and sleeves 30 that support the joint interface to the composite pipe segment 11 and provide strengthened joint coupling between adjacent pipe assemblies where tensile loads can do significant harm. Furthermore, to aid in drilling extended distances, it will be understood that as the composite layers are formed, additional carbon material may be added to strengthen the tensile load capacity of drill strings. The composite pipe 11 walls may also be conveniently adjusted to thicker or thinner thicknesses depending on the depth of drilling by forming the pipe segments with more or less composite layers.

It will be appreciated that the drill string is conducive to carrying torsional loads by both the internal fitting to composite wall interface and by the metallic outer sleeve. In operation, as the drill pipe string turns, force loads are distributed along the walls of the drill pipe assembly and are diffused over pipe walls expanding from the intermediate portion toward the joint assembly interfaces and ends. When loads propagate toward the joint assemblies, these loads encounter the dual tapered surface interface between the metallic end fittings 20 and metallic sleeves 30 confronting the composite pipe disposed intermediately therebetween distributing the loads across two surfaces interfaces. As torsional forces encounter the first tapered interface between the metallic end fitting and composite pipe, the tapered surfaces create a larger area of load confrontment thereby diffusing the load effects over a greater surface area. Those skilled will appreciate that this effect is enhanced by a second tapered interface between the composite pipe and sleeve tapered surfaces where the loads once again encounter an extended surface area diffusing the loads a second time as the outer sleeve carries part of the load. As such, drill assemblies for long reach with the proposed configuration can be assembled in strings beyond 35,000 feet in length.

Figure 5:
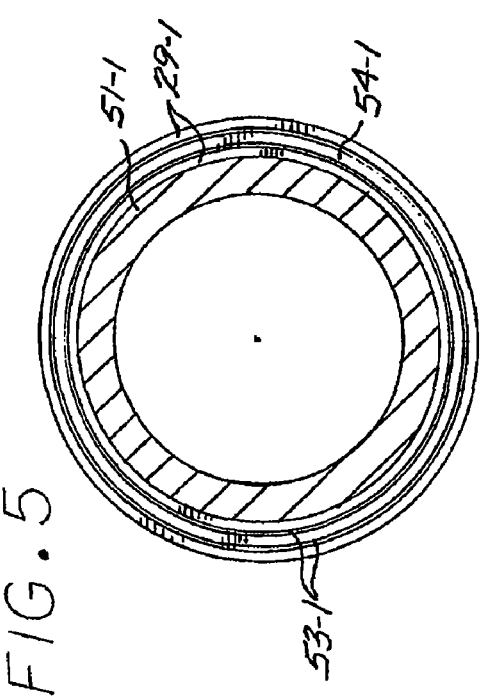
FIG. 5 is an enlarged end view taken along the line 5-5 shown in FIG. 4.
Figure 6:
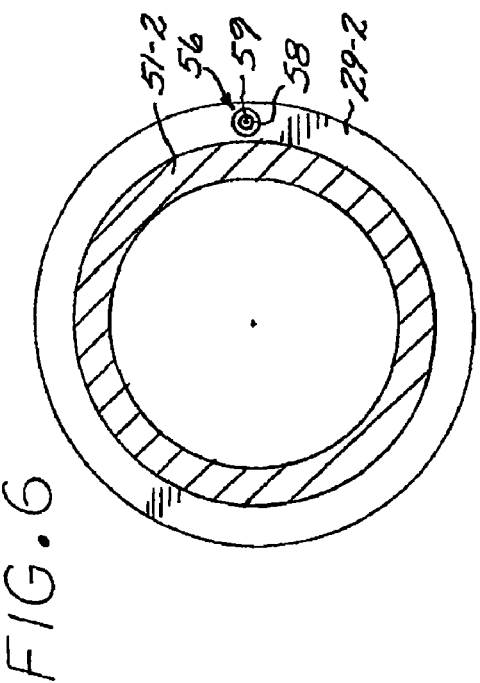
FIG. 6 is an enlarged end view taken along the line 6-6 shown in FIG. 4.
Figure 12:
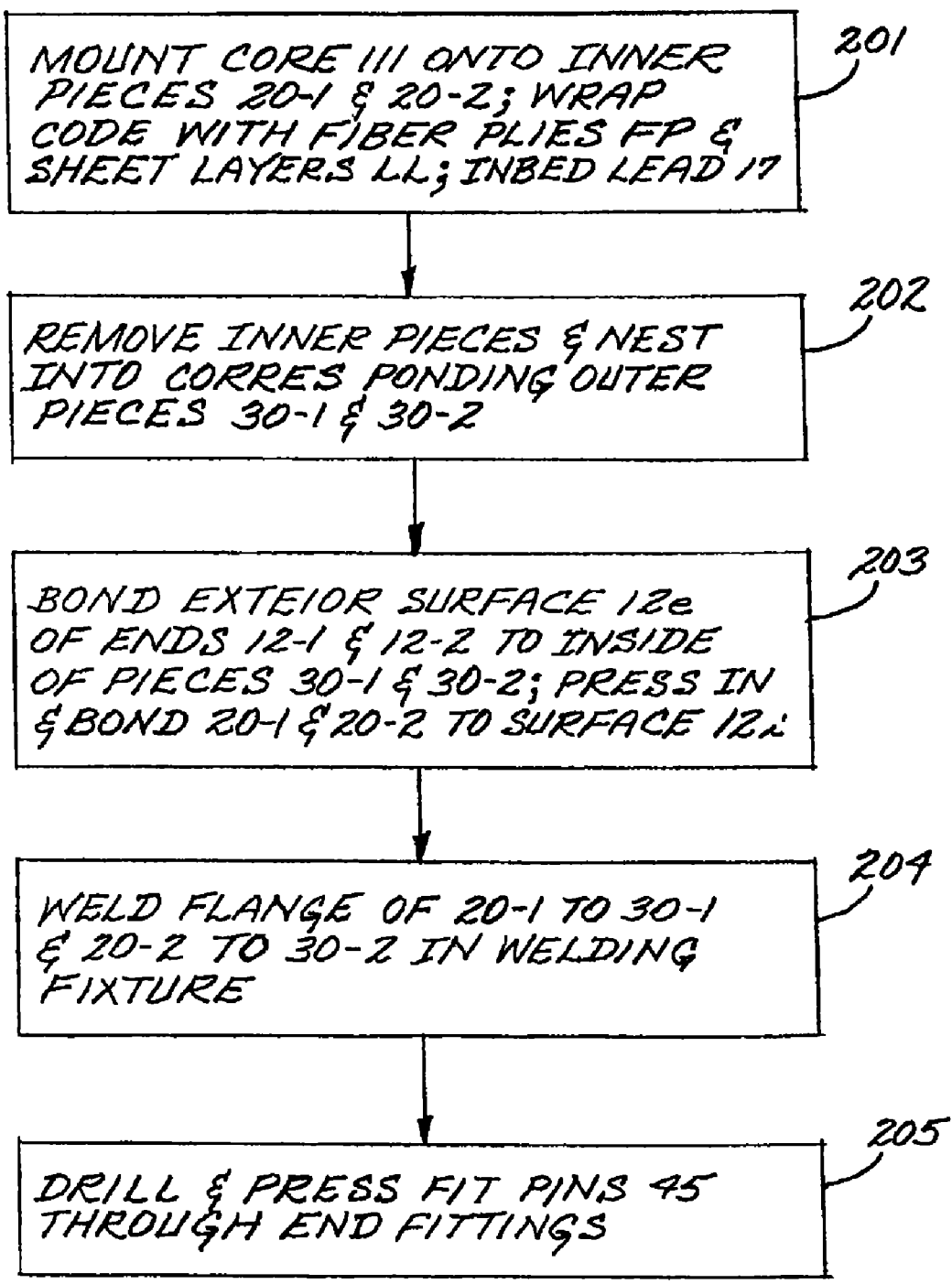
FIG. 12 is a sequence diagram of an end fitting assembly sequence in accordance with the present invention.

Referring to FIGS. 5-8, end fitting 20-2 includes a drilling 27-2 indexed with drilling 37 in the sleeve 30-2 to convey the other conductor end 18 into a manifold 56 (FIG. 8) formed in flange 29 and terminating in one or more openings 57 through shoulder surface 29-2 opposing the recess 53-1 when the ends are threadably mated. Opening 57, may in turn, be provided with a spring biased piston 58 carrying a bayonet point 59. Referring to FIG. 5, a sectional end view of the "pin" end is illustrated showing the insulated contact ring 54-1 circumscribed within the circular recess within the flange 29-1. The assembly of circular features in FIG. 5 are shown in relation to the features of FIG. 6 where the spring-biased piston and bayonet point on the "box" end in manifold 56 are in circumferential alignment to the ring. Once the bosses 51-1 and 51-2 are joined together, it is then useful to pressurize the manifold interior, advancing the piston against the spring bias to drive the bayonet point through the insulation on the opposingly aligned contact ring. In this manner, one example of circuit continuity is effected between the conductors 17 imbedded in the joined segments regardless of their relative orientation.

Those in the art will further appreciate that the foregoing arrangements are particularly suited for custom forming of composite pipe segments 10 by way of the nested end fittings described herein. By particular reference to FIGS. 9-12, the fitting end pieces 20-1 and 20-2 may be combined with a forming mandrel effected by an inner core layer 111 (FIG. 10), to form the turning core for the subsequent winding of fiber plies 92 and the remaining interleaved layers 93 forming the composite pipe 11, in step 201. In this step the winding pitch, fiber density and the selection of any sealing wraps may also be determined by the particular parameters of the well and the mandrel structure may be further stiffened and assisted by internal pressurization while the fiber wind-up tension is controlled. Of course, conductive leads 17 may be concurrently also imbedded into the wrap, again in accordance with the type and nature of the signals and/or power that may be conveyed thereon. Once the structural conditions are met the end fittings are withdrawn from the core layer and thereafter nested in the sleeve pieces 30-1 and 30-2 in step 202. A bonding agent, such as a high temperature epoxy resin is then applied to the pipe ends 12-1 and 12-2 and the ends are then re-positioned into the interiors of sleeve pieces 30-1 and 30-2 with the end fitting pieces 20-1 and 20-2 then pressed into their common interiors, shown as the self-centralizing step 203. In the course of this same step the exposed conductor ends 18 are conveyed into their appropriate drillings to be thereafter connected either to the bayonet contact 59 or the contact ring 54-1. In step 204 the foregoing assembly is then brought into a spray cooled welding fixture illustrated in FIG. 9 in which a weld 91 is applied by a welding device 151 to join the exterior flanges of the nested pieces 20-1 and 30-1 to each other (and by the same example also the nested pieces 20-2 and 30-2) while water spray heads 152 and 153 cool the adjacent structure. Optionally, once fixed by their flanges, the sleeve and end pieces, with the ends 12-1 and 12-2 captured therebetween, are then drilled, in step 205, with perforations 34 which thereafter receive press fit pins 45.

In this manner a self-centralized end arrangement is useful both in the manufacturing and also in effecting a closely held bond interface between the high strength metal end pieces and the composite pipe segment with the interface further stabilized and fixed by welding and press fit pins. Simultaneously, this manner of manufacture also provides a durable, convenient and effective manner of incorporating a conductor into the pipe fully protected by the pipe pieces. The resulting high strength joint is then further complemented by the appropriately selected wind-up pitch, weave density and interleaving that are selected for the particular task. Thus, the fabrication and the ending structure are rendered both highly effective and convenient.

It will also be appreciated that the aforedescribed drill pipe string may be improved upon to include enhanced configurations for effecting an electrical connection along the pipe string and modifications to the composite-metal interface providing a durable yet flexible structure conducive to short radius drilling.

Figure 13:
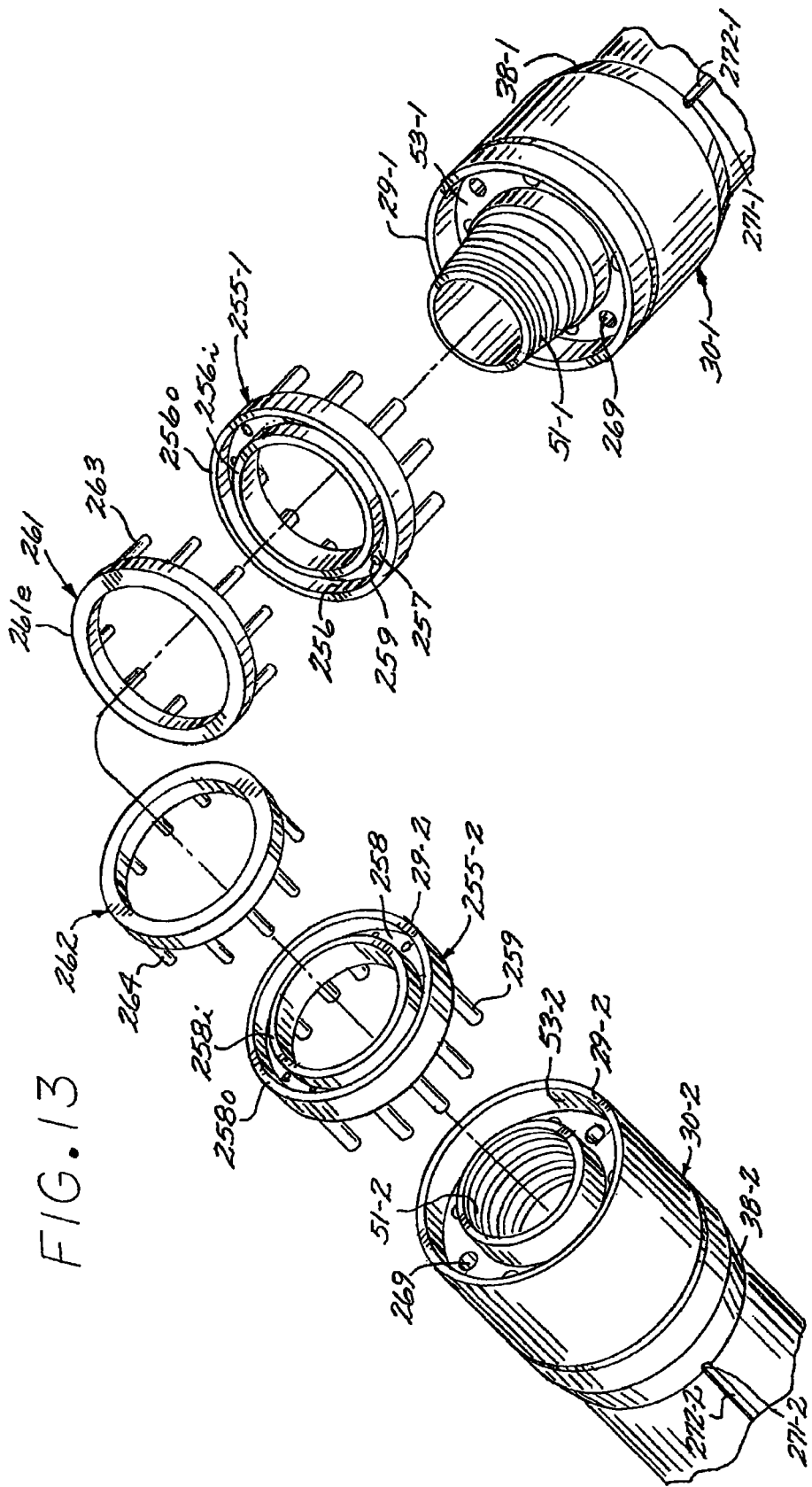
FIG. 13 is a perspective exploded illustration, of a second embodiment of the metal to composite end fitting of the present invention and showing an electrical contact mechanism bridging electrical conduction across a threaded pipe joint.
Figure 15:
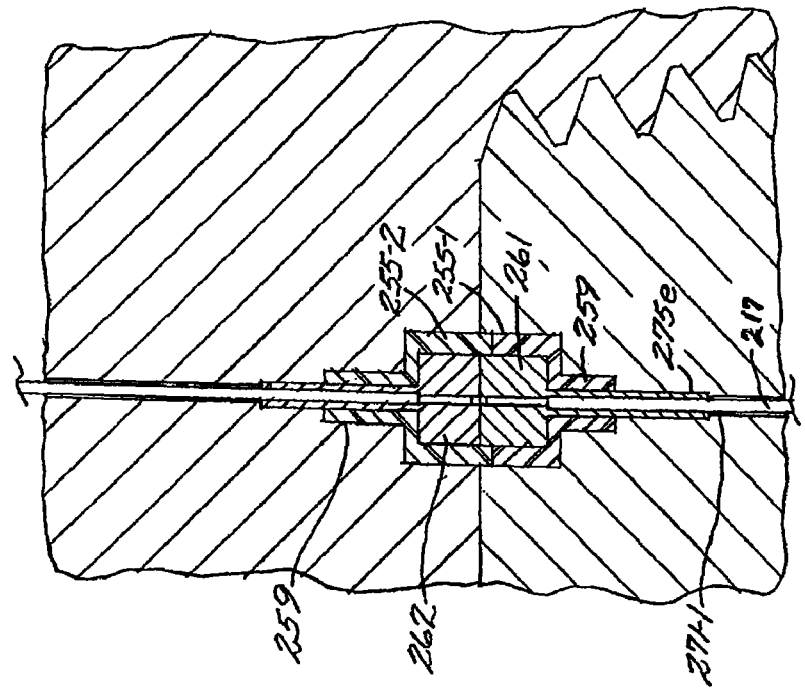
FIG. 15 is an enlarged sectional detail view of the contact mechanism shown generally in FIG. 13 after the full threaded engagement of a pipe joint.
Figure 14:
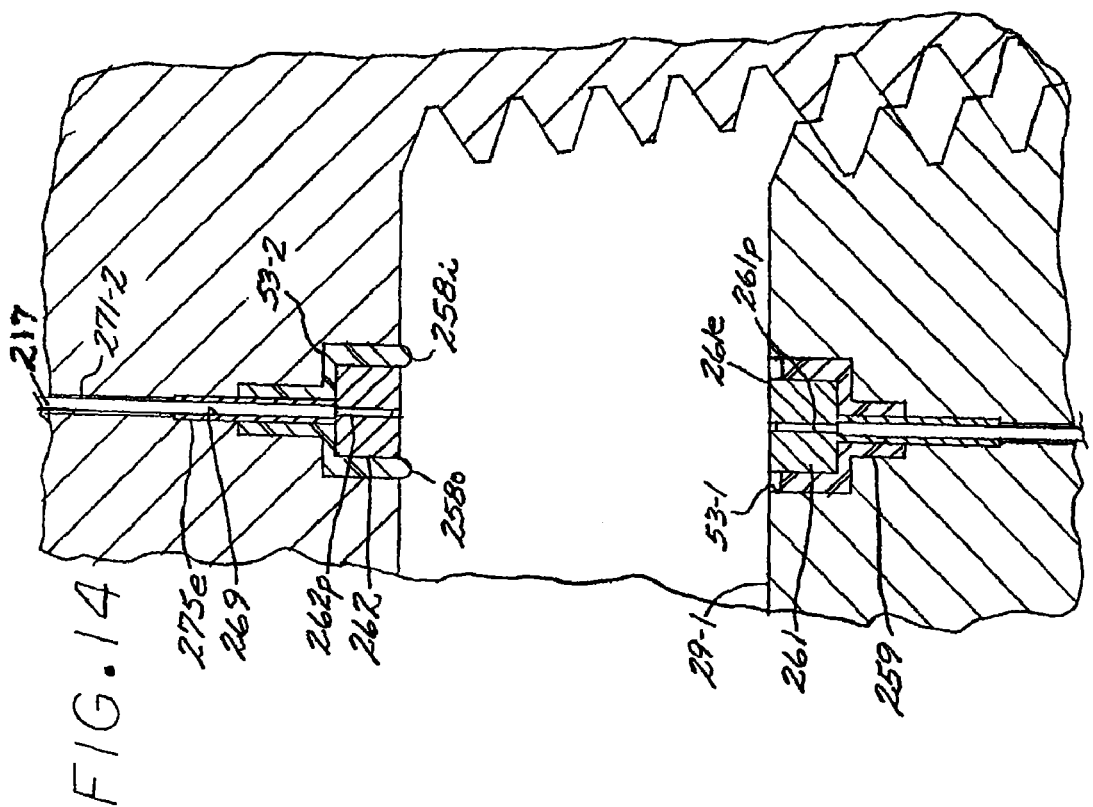
FIG. 14 is an enlarged sectional detail view of the contact mechanism shown generally in FIG. 13 before the full threaded engagement of a pipe joint.
Figure 16:
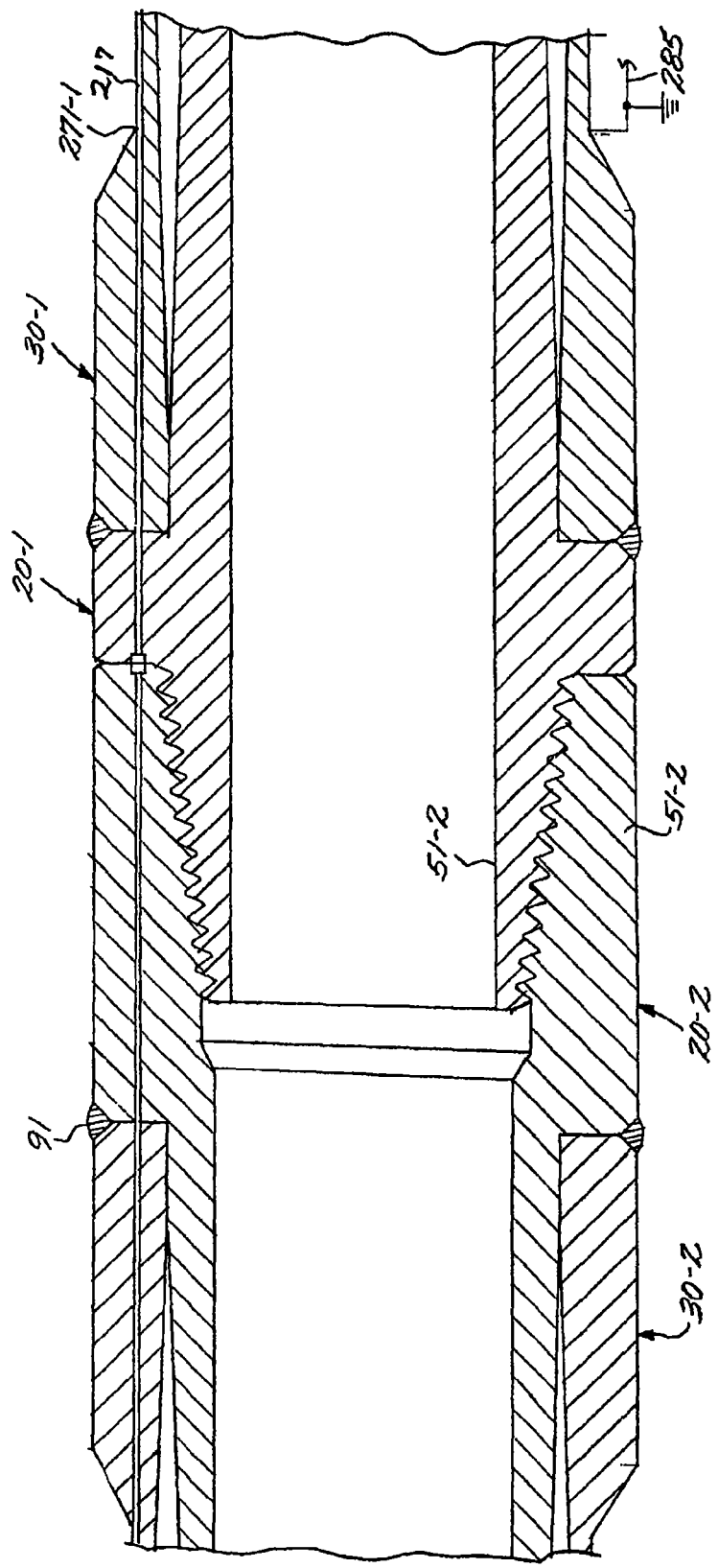
FIG. 16 is a side cross sectional view of the threaded joint interface and contact mechanism shown generally in FIG. 13.

By reference to FIGS. 13-16, a second preferred embodiment employs the interior and exterior distantly converging tapered surfaces at the opposite extremities of the composite segments 11 and showing an alternative contact implementation is obtained by embedding coaxial contact rings in each of the opposing shoulder surfaces 29-1 and 29-2 surrounding both the 'pin' end and the 'box' end of the joint assembly. As will be appreciated by those skilled in the art, one or the other or both of the tapers may be in the form of continuous smooth surfaces as shown in FIGS. 2 and 16 or in some instances in the form of stepped surfaces cooperating to progressively narrow the thickness of the segment wall in the distal direction. Once again, like numbered parts functioning in a manner like that previously described are utilized except that shoulder surfaces 29-1 and 29-2 are each provided with an annular groove 53-1 and 53-2 of a sectional dimension conformed to receive a corresponding elastomeric annular seal 255-1 and 255-2. Seal 255-1 is generally shaped as a U sectioned structure defined by concentric inner and outer annular walls 256$i$ and 256$o$ extending from a bottom wall 257. A conforming contact ring 261 chamfered along its upper edges by a peripheral chamfer 261$e$ is then captured by elastic stretching within the annular cavity 256 formed between the inner and outer sealing walls 256$i$ and 256$o$ of the seal 255-1 with the outer wall stretching just over the chamfer to retain the ring in position. A similarly dimensioned contact ring 262 is then received in the annular cavity 258 formed between the inner and outer walls 258$i$ and 258$o$ of the 'box' end seal 255-2, with the groove depth (or wall height) of walls 258$i$ and 258$o$ being substantially greater than the thickness of the ring 261 and 262 and the depth of the receiving recess 53-2. The height of seal 255-1, in turn, is somewhat less than its receiving recess 53-1. Preferably, both the contact rings 261 and 262 are inserted within their respective seals so that each contact surface projects just slightly above the corresponding surface 29-1 and 29-2, a projection determined by the dimensions of the annular recesses or grooves 53-1 and 53-2 and the dimensions of each seal. Of course, walls 258$i$ and 258$o$ each project beyond the corresponding surface of ring 262 before the threaded engagement of the joint, as illustrated in FIG. 14.

In this projecting deployment both the opposing seals and the rings seated therein are fixed in rotation in each corresponding recess 53-1 and 53-2 by way of spaced axial pins 263 and 264 that project from the buried edges of each of the rings 261 and 262 into conforming pockets 259 in each of the seal bottoms which are then inserted into conforming cavities 269 formed in the abutment surface bottoms of each of the recesses 53-1 and 53-2 (FIG. 13). The projecting seal edges and the rings therein therefore slide in rotation relative each other as the pipe joint is made. As illustrated in FIG. 15, once the joint is made, the excess volume of the elastomeric matter forming each of the seal walls 258$i$ and 258$o$ fills the volume of the concentric annular open-ended grooves defined by the respective edge chamfers 261$e$ which also assist in the spreading of the seat edges to facilitate a direct contact between the rings as illustrated before the mating in FIG. 14. Thus the edge chamfers in ring 261 allow for the elastomeric material flow of the seal material as the joint is threaded together, ensuring a completely surrounding sealing closure as the exposed edges of the rings are pressed against each other while the smaller contact dimension formed between the edge chamfers 261$e$ assures a better ring contact while also accommodating a somewhat less precise axial registration between the pipe segments. This same material flow may be utilized to both seal and capture the exterior insulation 275$e$ around a conductor 275 extending through corresponding drillings 271-1 and 271-2 through corresponding shoulders 38-1 and 38-2 and extending into one of the cavities 269 in the bottoms of recesses 53-1 and 53-2 to pass the respective lead ends 275 through the seal material and thereafter into perforations 261$p$ and 262$p$ in the corresponding rings 261 and 262. Referring to FIG. 16, a return conductor 285 connected directly between the pipe segment ends can then be utilized to provide the return or common ground. Thus, when environmental resistance is encountered at certain depths, the load carrying capacities of the drill string sections can be adjusted accordingly. In this manner, a rugged and reliable contact is effected, thus accommodating both the power and the signal needs in deep well drilling.

In operation, threaded assemblies may not result in the same two polar points aligning functionally. It may occur that a point on a threaded end does not meet a corresponding point on a receiving end more than once because the boss end may begin at a different point for threading or the degree of torque applied at the end of the threading shifts the points. Those skilled in the art will appreciate that by utilizing contact rings at the end fittings of a threaded pipe assembly, an effective and efficient means for conduction of a signal is maintained even where the conductors are not in direct contact or alignment to one another. It will be seen that the contact rings 262 and 261 will be in conductive engagement regardless of where the conductor 275 is situated on one end piece after threading relative to where the next conductor 275 is on an adjacent segment. Thus, as long as the contact rings are engaged and the conductors are in conductive proximity to the axial pins 263 of their respective contact ring and insulated from electrical diffusion from one another and the surrounding conductive elements, signal can be successfully transmitted from one conductor through the contact ring conjunction to the next conductor.

It will also be appreciated that by using annular seals 255 to incorporate the contact rings 261 and 262, an efficient means of maintaining the conductive integrity is preserved. The annular seal assists in protecting the contact ring from the conductive properties and stress imposed by the metal walls of the pipe end fittings. By sheathing the conductor in an insulation 275$e$ in conjunction with housing the contact rings in the annular seals, signal loss may be prevented from escaping to the pipe exterior. Once the two pipe ends are press fit, further insulation is achieved where the elastomeric flow fills the annular voids within the shoulders 29 of the two ends. By insulating the conductive components of the contact rings from other conductive components, a signal can be transmitted down a line without short. Additionally, as the pipe assembly advances through jagged rock surfaces contacting the drill pipe outer walls, it will be further appreciated that embedding the conductor 275 into the composite pipe segment walls and subsequently into the sleeves 30 and end fittings 20 protects the conductor from frictional contact with the surrounding environment.

It will be further appreciated that each of the conductors {17; 275} may be variously effected either as an electrical power lead, a signal lead or even a fiber optic filament. Of course, known techniques of signal superposition, frequency and/or pulse modulation or other signaling formats can then be effected by these leads to bring out down hole information directly to the rig operator as the drilling is taking place which can then be used to modify, in known techniques, the drilling direction and the cutting rate, commonly referred to as LWD or 'logging while drilling' and MWD or 'measuring while drilling.' In this manner, all the control and pipe compliance conditions can be conveniently accommodated in a pipe string that, because of its light weight, is particularly suited for ultra deep and/or extended reach drilling.

In a third preferred embodiment, it will be understood that for short radius drilling applications such as from offshore oil platforms where the drilling direction is rapidly changed to avoid obstructions or based on a feedback signal, the nested pieces and their respective tapered surfaces may be modified to withstand varying external loads on the pipe joints accommodating flexing during drilling while maintaining a metal-composite interface conducive for carrying a torsional load capacity. For example, the drill string configuration in FIGS. 17 and 18 is similar to the drill string embodiment shown in FIGS. 2-4, except that the longitudinal length of the metal end fitting 320 is concentric with and projects approximately 1 inch farther of the end of the outer sleeve 330 facilitating flexure at the metal-composite junction. Similar to the embodiment shown in FIGS. 2-4, end fittings 320-1 and 330-1 respectively also include tapered wall surfaces 332$i$ and 322$e$ projecting divergently away from the end fittings to form a conical nesting cavity with and for bonded receipt of tapered surfaces 312$i$ and 312$e$ of pipe segment ends 312-1. Additionally, those skilled will recognize that the composite pipe segment 311 can be constructed to include less carbon material providing more flexibility in the composite segment length. Thus, it will be appreciated that the pipe assembly 300 is conducive for providing quick turns while maintaining durable integrity during advancement of drilling.

In operation, as the drill assembly 300 rotates advancing toward an oil trap, the composite walls and offset metallic end portions provide a flexure point at the metal-composite interface facilitating directional change during short radius turns. Those skilled will recognize that the composite pipe walls are relatively more flexible than the metal end fittings. Thus, upon a relatively rapid change in drilling direction, the composite walls will bend in the direction of the turn and the internal metallic fitting end bends with the composite walls. The external metallic sleeve end, in turn, provides a flex point for the internal metal end fitting and composite wall to bend from while simultaneously supporting the metal-composite joint interface to partially carry torsional loads. As portions of the string advance past short radius turns, the bending loads on the composite walls lessen and the more rigid metal end fitting helps draw the composite walls back to a linear state. Similar to the embodiment shown in FIGS. 2-4, as loads propagate down the drill string and encounter the metallic-composite joint interface, torsional loads once again encounter two extended cross-sectional areas between the metal and composite surfaces and thus, diffuse the loads at the two interfaces. Thus, an appreciable degree of flexibility may be achieved during short radius drilling while providing a durable structure that can return to is rigidity as the pipe string is extracted from its hole.

It will also be recognized that the drilling experience is further enhanced by incorporating the conductor 275 to the pipe assembly 300 without detracting from the efficiency of or compromising the integrity of the assembly structure. As a string travels deeper into earth and the loads continue to mount on the string structure, it will be appreciated that measuring signals sent along the string via the conductor 275 can provide feedback for adjusting rotational speed as well as update the composition of surrounding geological attributes relative to oil proximity. The flexibility of the conductor cooperates with the advancement of the pipe assembly 300, particularly in short radius applications where the conductor can flex right along with the pipe segment during tight turns.

By using a composite material for the pipe in combination with metal end fittings, a lighter and cost-effective solution is demonstrated for deep well drilling. Furthermore, those skilled in the art will appreciate that assembling a drilling pipe with offset metal component ends provides for competitive structural integrity and flexing during small radius turning. By proposing a conductor imbedded in the pipe walls and the end to end mating with the exemplary connections shown, a protected and uninterrupted signal may be sent down the length of the pipe and a return signal monitored providing data for necessary adjustments during drilling.

We claim:

1. A drill pipe string for end to end connection to transmit communication signals and comprising:
   composite walls forming elongated pipe segments having first and second extremities;
   a first and second metal end fittings formed with complementary screw threads to connect together and configure with confronting shoulders including respective first and second grooves;
   one or more conductor lead segments imbedded in the walls of respective pipe segments and extending between the respective first and second extremities therein and projecting distally therefrom to project through the respective first and second metal fittings to form mating connector links;
   first and second connectors in the respective first and second grooves and connected to the respective mating connector links and operative upon respective extremities of the pipe segments being screwed together to make physical contact with one another for transmission of the communication signals;
   first and second electrical insulators interposed in the respective first and second grooves to insulate the respective first and second connections.

2. The drill pipe string of claim 1 wherein:
   the confronting shoulders are constructed with the first and second grooves deferring first and second annular insulator grooves formed with respective first and second predetermined axial depths;
   the first and second connectors are in the form of first and second connector rings;
   the first and second insulators are in the form of first and second pliable insulator rings, the first ring formed with an axial depth less than the first predetermined axial depth and cooperating with the first groove and connector ring to form respective open ended inner and outer annular insulator grooves, the second insulator rings are formed with an axial depth greater than the second predetermined axial depth to cooperate with the axially projecting inner and outer walls configured to project from the respective insulator groove and constructed to, when the pipe segments are screwed together, project into the respective open-ended inner and outer annular grooves to cooperate in forming a seal.

3. A drill pipe string of claim 1 that includes:
a means for fixing contactors to the respective first and second fittings against rotation relative thereto.

4. The pipe string of claim 1, wherein:
the mating connector links are optical fibers.

5. A drill pipe string for end to end connection to transmit communication signals, comprising:
composite walls forming elongated pipe segments having first and second extremities;
first and second metal fittings formed with complimentary screw threads to connect the segments together and confronting shoulders having respective shoulder supports and including respective first and second axially opening annular insulation grooves and further including a plurality of axial cavities spaced about the respective grooves and openings thereto;
a plurality of conductor leads segments embedded in the walls of the respective pipe segments and extending between the first and second extremities thereof and projecting distally therefrom to project through respective first and second metal fittings of the fittings to form connector links, first and second annular insulation rings received in the respective insulation grooves and formed with respective axially open ended contact grooves and including respective axially projecting pocket tubes spaced thereabout and configured and located to be received axially in the respective cavities and configured with an axial depth, the tubes being formed with open-ended contact bores; first and second contact rings configured to be received in the respective first and second insulation grooves the insulation rings including axial pins spaced there around for axial receipt in the respective contact bores, the pins being configured with respective hollow centers deferring perforations receiving the respective contact links.

6. The pipe string of claim 5 wherein:
the contact rings are elastic and sized to be stretched for being received in respective first and second the contact grooves.

7. The pipe string of claim 5 wherein:
the first and second insulation rings are elastic and constructed to be stretched to be received in the respective first and second insulation grooves.

8. The pipe string of claim 5 wherein:
the insulation rings are constructed with respective concentric annular walls, the annular walls of one of the insulation rings terminating short of the first shoulder surface to form respective open annular grooves and the other insulation ring been formed with annular walls configured with projections for, when the fillings are screwed together projecting from the shoulder surface to be received compressively into the respective open grooves.

* * * * *